United States Patent [19]

Landry

[11] Patent Number: 4,944,525
[45] Date of Patent: Jul. 31, 1990

[54] SELF LOCKING TRAILER HITCH

[76] Inventor: Doyle L. Landry, Rt. 46, Box 295, Lafayette, La. 70508

[21] Appl. No.: 374,876

[22] Filed: Jul. 3, 1989

[51] Int. Cl.$^5$ .......................... B60D 1/44; B60D 1/14
[52] U.S. Cl. ................................ 280/479.3; 280/479.2
[58] Field of Search ................. 280/479.2, 479.3, 477, 280/504, 508, 514, 515, 478.1

[56] References Cited

U.S. PATENT DOCUMENTS

| | | | |
|---|---|---|---|
| 3,093,395 | 6/1963 | Boutwell | 280/479.2 |
| 3,169,028 | 2/1965 | Scrivner | 280/479.2 |
| 4,350,362 | 9/1982 | Landers | 280/478.1 |
| 4,603,878 | 8/1986 | Smith | 280/479.2 |
| 4,792,153 | 12/1988 | Galdes | 280/479.3 |

*Primary Examiner*—Charles A. Marmor
*Assistant Examiner*—Alan M. Kagen
*Attorney, Agent, or Firm*—John D. Jeter

[57] ABSTRACT

A self-locking trailer hitch has a frame arranged for attachment to a vehicle, a housing arranged to slide longtudinally on the frame between extended and retracted positions, a swing bar pivotally attached to the housing to swing laterally about a vertical axis so that a hitch ball on the free end of the swing bar can be moved about for coupling of two vehicles. The swing bar, housing and frame have holes that will align when the swing bar is centered and the housing is extended, and a spring loaded pin that will lock the three holes and, hence, the related parts into extended and centered position when the towing vehicle is driven forward after coupling.

5 Claims, 1 Drawing Sheet

SELF LOCKING TRAILER HITCH

This invention relates to trailer hitches generally and more specifically to a hitch that is longitudinally extensible and laterally swingable to faclitate coupling a trailer to a towing vehicle.

BACKGROUND OF THE INVENTION

In normal use, the coupling between trailer and towing vehicle must be secure in one position for stability at driving speeds. When coupling the two vehicles together, however, it is desirable to have some flexibility in hitch position to reduce the precision required in relative positioning of the vehicles. A hitch that can be moved about for coupling and locked into a precise and secure position for towing is needed. In the prior art, several approaches have been suggested Prior art Patents that are representative are listed below.

U.S. Pat. No. 3,083,986
U.S. Pat. No. 3,329,445
U.S. Pat. No. 3,397,900
U.S. Pat. No. 3,521,908
U.S. Pat. No. 3,612,576
U.S. Pat. No. 3,698,739
U.S. Pat. No. 4,350,362

The predominant teachings of the Patents listed above pertain to hitches that are centered for locking by longitudinal forces between hitch elements that result from 27 towing or backing of the trailer. Each Patent has merit and some disadvantage in accomplishing the objectives as 29 will be appreciated by those skilled in the art.

It is an object of this invention to provide a trailer hitch that is usable on either a towed or towing vehicle, that is extensible and retractable, and laterally swingable, when coupling two vehicles and automatically lockable in a preselected position by the act of driving the towing vehicle forward.

These and other objects, advantages, and features of this invention will be apparent to those skilled in the art from a consideration of this specification, including the attached claims and appended drawings.

SUMMARY OF THE INVENTION

The hitch of this invention is adapted to be mounted on either a towed or towing vehicle to couple the two together. The preferred embodiment has a housing with a square bore longitudinally slidable on either the tongue of the trailer or a square frame attached to the towing vehicle (tractor). Attachment to the tractor is usually by mounting the square frame into the bore of a conventional receiver. The housing, preferably a box shaped weldment of plates, has a swing bar pivotably attached to the top to swing horizontally about a pin with provision for a coupling device, usually a vertically extending ball, on the free end. A pin is mounted on the bar and arranged to extend through three holes to secure the hitch in a preselected stable position. When the bar is aligned with the longitudinal center of the housing, the pin extends through close fitting holes in the bar and housing. When the housing is near the extension limit on the tongue or frame, the pin extends farther through a close fitting hole in the frame or tongue to secure the hitch in position for towing. To couple the tractor and trailer, the pin is manually lifted and the bar is moved laterally and the housing is moved longitudinally to juxtapose the trailer and tractor hitch coupling elements. After coupling is accomplished, the tractor is then driven forward. The trailer load causes the bar to swing toward longitudinal center and the housing slides to the limit stop on the tongue or frame. The spring loaded pin moves into the three aligned holes and the coupling is secure.

BRIEF DESCRIPTION OF DRAWINGS

In the drawings wherein like features have like captions.

DETAILED DESCRIPTION OF DRAWINGS

In the interest of descriptive clarity, features pertaining to manufacturing and maintenance utility and not bearing on points of novelety, such as weld lines, threaded fastenings, and the like have been omitted.

Figure 1:
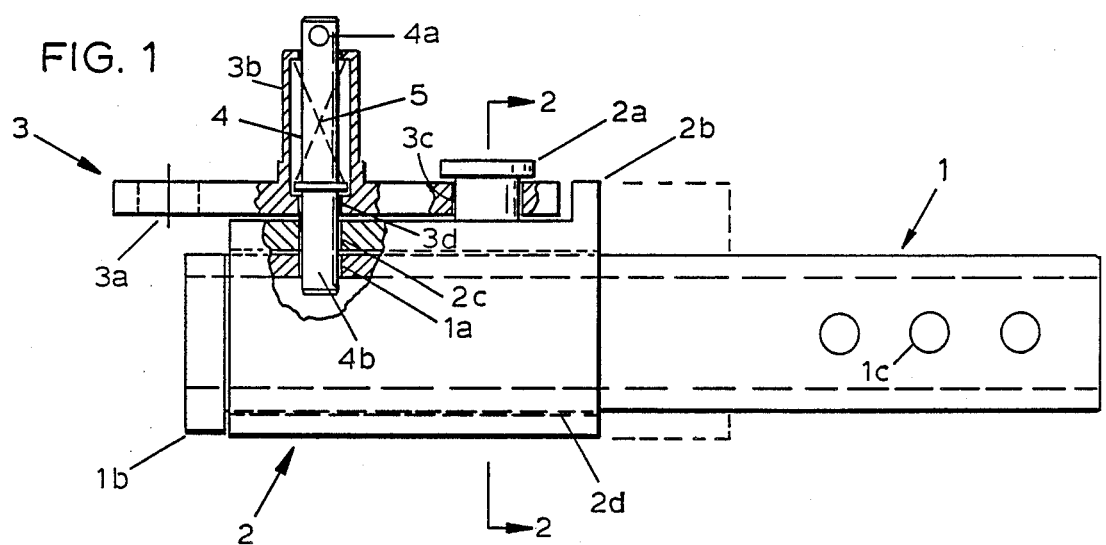
FIG. 1 is a side elevation, partly cut away, of the preferred embodiment of the invention.
Figure 2:
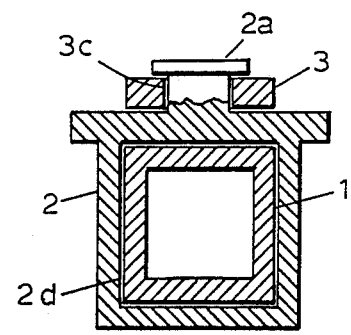
FIG. 2 is a sectional view taken along line 2 of FIG. 1.

In FIG. 1, frame 1 is a non-circular hollow bar, preferably square in section. Means to fasten the bar to a vehicle is represented by holes 1c for pins when the preferred bar is inserted in a conventional square receiver bore. Housing 2 has a non-circular bore, square in this case, for sliding longitudinally along frame 1. Abutment 1b confines the housing on the frame. The vehicle present when the hitch is in use provides the needed stop in the other direction. If frame 1 is a trailer tongue, an optional feature, a second abutment stop is usually welded to the frame to allow the housing a few inches of travel on the frame.

On the housing upper surface, pin 2a protrudes and confines swing bar 3 for rotation about the pin vertical axis for horizontal swing. The amount of swing is limited by abutment 2b. Swing bar 3 has provisions at the free end for attachment of a hitch element, preferably a ball. The conventional vehicle coupling hitch has a ball for attachment to one vehicle and a socket for attachment to the second vehicle. The ball and socket is not part of this invention. Military type ring and pintle couplers may be used with the bitch. To accept such hitch components, the hole 3a may be replaced with the appropriate provision for attachment of one of those components.

Figure 3:
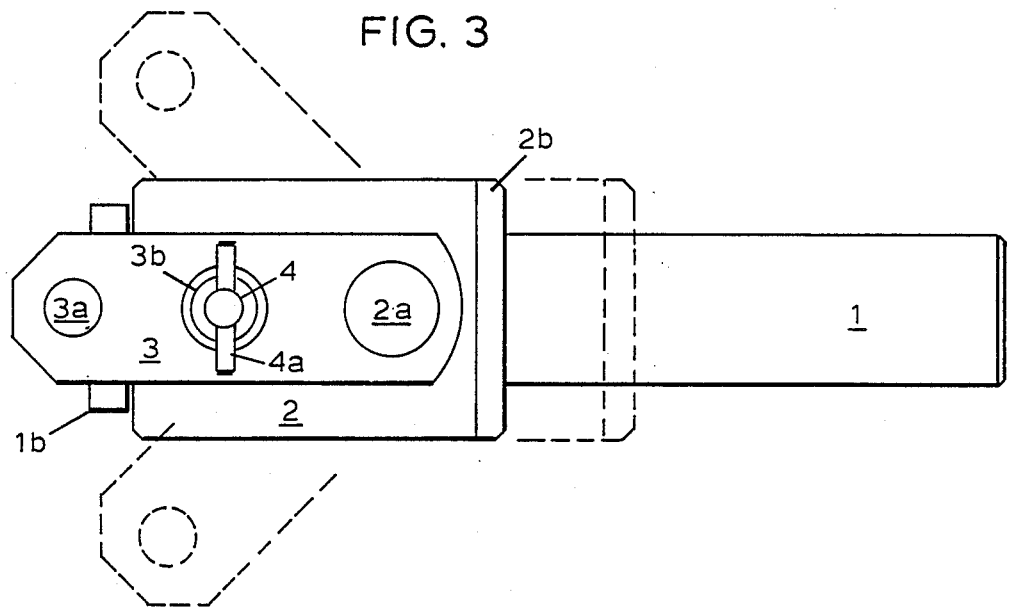
FIG. 3 is a top elevation of the hitch of FIG. 1.

FIGS. 1 and 3 show the hitch centered and locked for road use. To allow the swing bar to move laterally, pin 4 is lifted by handle 4a to oppose spring 5 and clear holes 1a and 2c by pin end 4b. The bar can then swing as shown by dotted lines in FIG. 3. Housing 2 can also slide toward the vehicle as shown by dotted lines. Pin 4 does not move downward because the top plate of the housing is large enough to engage the lower end of the pin throughout the lateral swing.

When the coupling elements on the two vehicles to be coupled are aligned and coupling accomplished, the towing vehicle is driven forward. The laterally displaced swing bar moves toward the longitudinal center of the hitch in response to towing forces and the same forces move the housing toward abutment 1b. When pin 4 is aligned with hole 2c it is spring biased into that hole to secure the swing bar rigidly to the housing. When pin 4 is aligned with hole 1a it is biased farther in and longitudinally secures the housing to the frame.

FIG. 3 shows the relationship of bore 2d and the shape of the frame section. Frame 1 is preferably a two inch square tube as commonly found in trailer tongues and in stub frames for vehicle receivers. The hitch can be used on tractor or trailer but is usually used on the towing vehicle commonly called the tractor.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, I claim

1. A center locking hitch comprising:
   (a) an elongated frame with means for attachment to a vehicle;
   (b) a housing with means to attach to said frame for limited longitudinal movement thereon between an extended towing position and a retracted vehicle coupling position wherein said means to attach said housing to said frame comprises a non-circular longitudinal bore in said housing and a cooperating non-circular surface on said frame telescopingly received therein for said limited longitudinal movement;
   (c) a swing bar pivotally mounted on said housing for swingable movement about a vertical axis, with provisions at a free end for attachment to another vehicle;
   (d) said housing, frame, and swing bar each having apertures with such apertures disposed in alignment when said swing bar is centered on said housing and said housing is in said extended position;
   (e) a locking pin mounted on said swing bar for extension through said apertures when they are in alignment to lock the hitch in towing position.

2. The hitch of claim 1 wherein said frame is provided with at least one abutment arranged to engage said housing to limit said longitudinal movement.

3. The hitch of claim 1 wherein a spring is arranged to apply force to said locking pin relative to said swing bar to urge said pin into said apertures.

4. The hitch of claim 1 wherein said frame is a square tube and said means for attachment to a vehicle comprises lateral holes for pins associated with a square bore hitch receiver.

5. The hitch of claim 1 wherein said frame is the tongue of a trailer, said vehicle being said trailer.

* * * * *